(12) United States Patent
Katchmart

(10) Patent No.: US 11,417,361 B2
(45) Date of Patent: Aug. 16, 2022

(54) WRITE TIMING FOR RRO FIELD IN A CONSTANT DENSITY SERVO SYSTEM

(71) Applicant: Marvell Asia Pte, Ltd., Singapore (SG)

(72) Inventor: Supaket Katchmart, San Jose, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 17/445,213

(22) Filed: Aug. 17, 2021

(65) Prior Publication Data

US 2022/0059129 A1 Feb. 24, 2022

Related U.S. Application Data

(60) Provisional application No. 63/067,645, filed on Aug. 19, 2020.

(51) Int. Cl.
| | |
|---|---|
| *G11B 5/596* | (2006.01) |
| *G11B 19/04* | (2006.01) |
| *G11B 5/012* | (2006.01) |
| *G11B 5/55* | (2006.01) |
| *G11B 19/14* | (2006.01) |

(52) U.S. Cl.
CPC ............ *G11B 19/041* (2013.01); *G11B 5/012* (2013.01); *G11B 5/5526* (2013.01); *G11B 5/59616* (2013.01); *G11B 19/14* (2013.01); *G11B 2220/2516* (2013.01)

(58) Field of Classification Search
None
See application file for complete search history.

(56) References Cited

U.S. PATENT DOCUMENTS

| | | | | |
|---|---|---|---|---|
| 4,799,112 A * | 1/1989 | Bremmer | ............... | G11B 5/012 |
| 6,415,349 B1 * | 7/2002 | Hull | ................. | G11B 20/10009 360/73.02 |
| 6,775,091 B1 * | 8/2004 | Sutardja | ............ | G11B 5/59627 360/77.04 |
| 6,965,491 B1 * | 11/2005 | Perlmutter | ......... | G11B 5/59627 360/77.04 |
| 7,400,464 B1 * | 7/2008 | Katchmart | ......... | G11B 5/59627 |
| 7,773,328 B1 * | 8/2010 | Katchmart | ......... | G11B 5/59627 360/77.04 |
| 7,787,210 B1 * | 8/2010 | Drouin | ............... | G11B 5/59627 360/77.04 |
| 7,872,828 B1 | 1/2011 | Sutardja et al. | | |
| 7,982,990 B1 * | 7/2011 | Yu | .................... | G11B 20/10314 360/39 |

(Continued)

*Primary Examiner* — Peter Vincent Agustin

(57) ABSTRACT

A method for writing repeatable run-out data, representing a recurring contribution to position error, to a rotating constant-density magnetic storage medium, includes repeating, for each respective track at a respective radius of the constant-density magnetic storage medium, (1) determining a respective track pattern frequency based on track location and desired data density, (2) locating a position in a respective servo wedge on the respective track based on servo sync mark detection, (3) writing the repeatable run-out data to the respective servo wedge at a time delay, from the location of the position in the respective servo wedge, that is inversely proportional to the respective radius, to achieve a predetermined offset, and (4) repeating the determining, the locating and the writing for each servo wedge on the respective track of the constant-density magnetic storage medium.

20 Claims, 9 Drawing Sheets

(56) References Cited

U.S. PATENT DOCUMENTS

| | | | | |
|---|---|---|---|---|
| 8,737,011 B1* | 5/2014 | Buch | ............... | G11B 5/59655 360/77.02 |
| 10,832,716 B2 | 11/2020 | Katchmart | | |
| 10,971,187 B2 | 4/2021 | Katchmart | | |
| 2006/0098330 A1* | 5/2006 | Takaishi | ............ | G11B 5/59627 360/78.04 |
| 2008/0030894 A1* | 2/2008 | Sun | ............... | G11B 5/59627 360/98.02 |
| 2022/0059129 A1* | 2/2022 | Katchmart | ............ | G11B 5/012 |

* cited by examiner

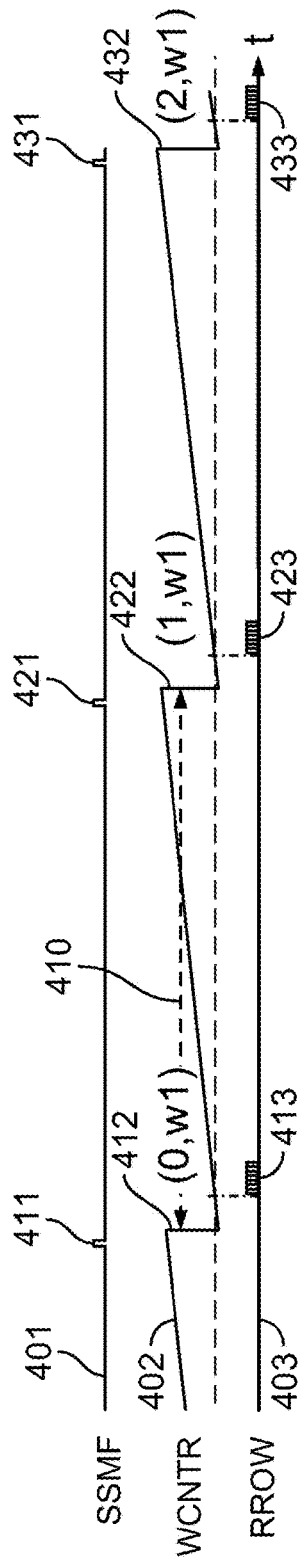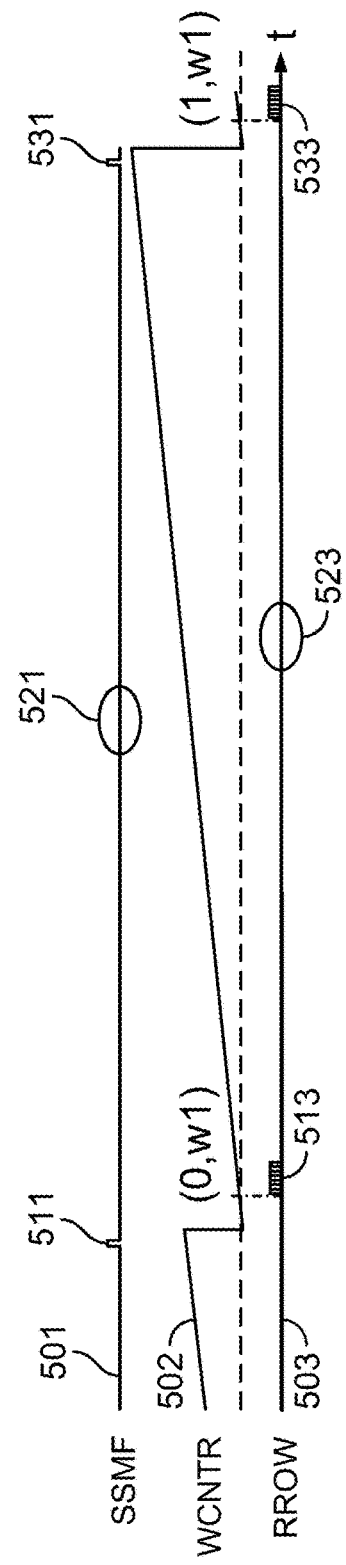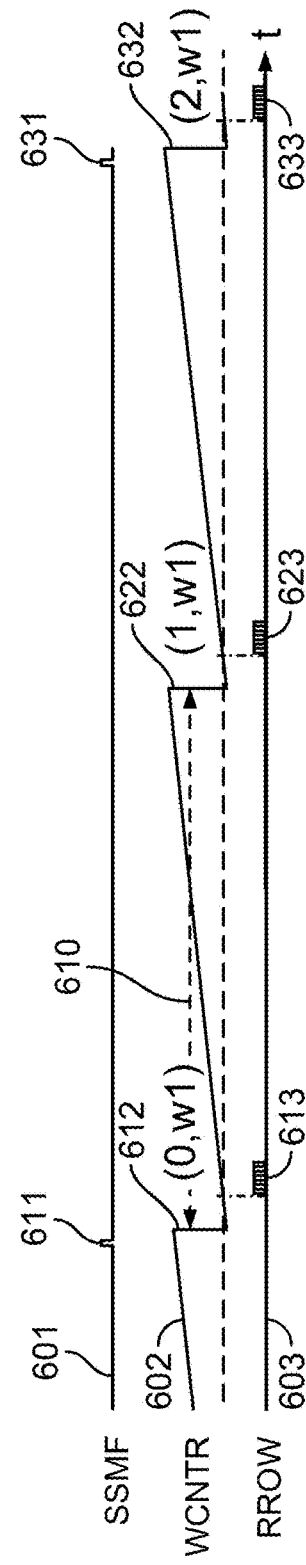

| Data | | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| | | | | | | | Wedge (NWCNTR+1) | | | | | | | | | | | |
| 901 | Time Stamp | 1000 | 2000.5 | 3000.5 | 4001 | 5001 | 6001 | 7001.5 | 8001.5 | 9001.5 | 10001.5 | 11002 | 12002 | 13002 | 14002 | 15002 | 16002 | 17002 |
| 902 | Typical DSW | | | | | | | | | | | | | | | | | |
| | TS Delta | N/A | 1000.5 | 1000 | 1000.5 | 1000 | 1000 | 1000.5 | 1000 | 1000 | 1000 | 1000.5 | 1000 | 1000 | 1000 | 1000 | 1000 | 1000 |
| 903 | Error | N/A | 0.5 | 0 | 0.5 | 0 | 0 | 0.5 | 0 | 0 | 0 | 0.5 | 0 | 0 | 0 | 0 | 0 | 0 |
| 904 | New DSW | | | | | | | | | | | | | | | | | |
| | TS Target | N/A | 2000 | 3000 | 4000 | 5000 | 6000 | 7000 | 8000 | 9000 | 10000 | 11000 | 12000 | 13000 | 14000 | 15000 | 16000 | 17000 |
| 905 | Error | N/A | 0.5 | 0.5 | 1 | 1 | 1 | 1.5 | 1.5 | 1.5 | 1.5 | 2 | 2 | 2 | 2 | 2 | 2 | 2 |

FIG. 9

WRITE TIMING FOR RRO FIELD IN A CONSTANT DENSITY SERVO SYSTEM

CROSS REFERENCE TO RELATED APPLICATION

This disclosure claims the benefit of commonly-assigned U.S. Provisional Patent Application No. 63/067,645, filed Aug. 19, 2020, which is hereby incorporated by reference herein in its entirety.

FIELD OF USE

This disclosure relates to the timing of write operations for a repeatable run-out (RRO) field in storage devices such as disk drives that use constant-density writing. More particularly, this disclosure relates to techniques for controlling the timing when writing an RRO field in a particular track of a constant-density servo wedge.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

In magnetic recording, as one example, reading and writing are performed by one or more heads that move relative to the surface of a storage medium. Many magnetic disk drives, for example, include a plurality of individual disks, or "platters," which may be two-sided—i.e., each platter can store data on each of its two sides. Therefore, such a disk drive would have at least two heads for each platter. Indeed, for each platter, there is normally at least one write head and at least one separate read head, so that such a disk drive normally has at least four heads per platter.

In a common configuration, all of the heads in a given disk drive are mounted on arms attached to a common actuator that controls the radial position of the heads (an angular, tangential or circumferential component of motion is provided by the rotation of the platters relative to the heads). This is true whether there is one or many platters, and one or multiple heads per platter.

In order to control the radial position selected by the actuator, each surface of each platter has distributed upon it positional information referred to as "servo" data. The servo data are commonly distributed in spaced-apart servo "wedges" (generally spaced equiangularly) on the platter surface. By reading the servo data as each servo wedge passes under the read head, the disk drive controller can determine the precise radial (and angular) position of the head and can feed back that determination to control the position of the read head or the write head, depending on the required operation. One component of servo data is a "repeatable run-out," or RRO, field, which characterizes repeatable contributions to error, so that it can be factored into position determinations.

In typical disk drives, data is written at a constant frequency—e.g., determined by the disk rotation—regardless of track, which means data is written less densely on tracks near the outer diameter than on tracks near the inner diameter. In other disk drives, zoned writing may be used, where the disk is divided radially into zones. The density at the innermost radius of each zone is about the same, but the density still decreases radially within each zone. More recently, constant-density writing has been developed, which involves writing at different frequencies on different tracks, including when writing servo data such as RRO patterns.

SUMMARY

According to implementations of the subject matter of this disclosure, a method for writing repeatable run-out data, representing a recurring contribution to position error, to a rotating constant-density magnetic storage medium, includes repeating, for each respective track at a respective radius of the constant-density magnetic storage medium, determining a respective track pattern frequency based on track location and desired data density, locating a position in a respective servo wedge on the respective track based on servo sync mark detection, writing the repeatable run-out data to the respective servo wedge at a time delay, from the location of the position in the respective servo wedge, that is inversely proportional to the respective radius, to achieve a predetermined offset, and repeating the determining, the locating and the writing for each servo wedge on the respective track of the constant-density magnetic storage medium.

In a first implementation of such a method, locating the position in the respective servo wedge based on servo sync mark detection may include locating the position in each respective servo wedge by detecting a respective servo sync mark in the respective servo wedge.

According to a first aspect of that first implementation, writing the repeatable run-out data to the respective servo wedge at the predetermined offset may include writing the repeatable run-out data to the servo wedge after the time delay from detection of the respective servo sync mark to reach a repeatable run-out field location in the respective servo wedge.

A second aspect of that first implementation may further include locking a clock source to rotation of the rotating constant-density magnetic storage medium by measuring elapsed time between detection of successive servo sync marks, and adjusting the clock source so that measured elapsed time between any two successive servo sync marks matches elapsed time between any other two successive servo sync marks.

In a second implementation of such a method, locating the position in the respective servo wedge based on servo sync mark detection may include locating a first servo wedge by detecting a first servo sync mark and determining respective locations of each successive servo wedge by adding a predetermined interval to each servo wedge location, and the method may further include continuing to detect respective servo sync marks, measuring a respective time interval between each respective servo sync mark detection and a predetermined event during each respective servo wedge, and when a respective measured time interval, between a respective servo sync mark detection and the predetermined event during a respective servo wedge, differs from respective measured time intervals between previous respective servo sync mark detections and previous occurrences of the predetermined event during respective previous servo wedges, taking corrective action.

According to a first aspect of that second implementation, taking corrective action may include aborting the writing of the repeatable run-out data to the rotating constant-density magnetic storage medium.

A second aspect of that second implementation may further include locking frequency of a clock source to rotation of the rotating constant-density magnetic storage medium by measuring elapsed time between detection of a first servo sync mark and detection of each subsequent servo sync mark detected, and when elapsed time, between the detection of the first servo sync mark and detection of a respective subsequent servo sync mark, differs from an elapsed time, between the detection of the first servo sync mark and detection of the respective subsequent servo sync mark, that is expected based on an expected interval between successive servo sync marks and how many intervals have passed between the first servo sync mark and the respective subsequent servo sync mark, taking corrective action.

In a first instance of that second aspect, taking corrective action may include adjusting angular velocity of the rotating constant-density magnetic storage medium.

A second instance of that second aspect may further include aligning phase of the repeatable run-out data to the locked frequency of the clock source.

In a first variant of that second instance, aligning the phase of the repeatable run-out data to the locked frequency of the clock source may include, after locking the frequency of the clock source, and before writing any repeatable run-out data to any servo wedge on the rotating constant-density magnetic storage medium, writing a phase calibration pattern to each respective repeatable run-out field in each respective servo wedge on each track, reading the phase calibration pattern from each respective repeatable run-out field in each respective servo wedge on each track and determining a respective phase offset for each respective repeatable run-out field in each respective servo wedge on each track, and setting a respective delay for writing of repeatable run-out data to each respective repeatable run-out field in each respective servo wedge on each track to compensate for the respective phase offset.

According to implementations of the subject matter of this disclosure, a storage device includes a rotating constant-density storage medium on which servo data is written, the servo data including a repeatable run-out field representing a recurring contribution to position error, and circuitry for writing the repeatable run-out field. The circuitry includes a detector configured to locate a respective servo wedge on each respective track of the constant-density magnetic storage medium based on servo sync mark detection, and a controller configured to repeat, for each respective track at a respective radius of the constant-density magnetic storage medium, determining a respective track pattern frequency based on track location and desired data density, locating a position in a respective servo wedge of the respective track of the constant-density magnetic storage medium based on output of the detector, writing the repeatable run-out data to the respective servo wedge of the respective track of the constant-density magnetic storage medium at a time delay, from the location of the position in the respective servo wedge, that is inversely proportional to the respective radius, to achieve a predetermined offset, and repeating the determining, the locating and the writing for each servo wedge on the respective track of the constant-density magnetic storage medium.

In a first implementation of such a storage device, the controller may be configured to locate the position in the respective servo wedge of the respective track of the constant-density magnetic storage medium by detecting a respective servo sync mark in the respective servo wedge of the respective track of the constant-density magnetic storage medium.

According to a first aspect of that first implementation, the controller may be configured to write the repeatable run-out data to the respective servo wedge of the respective track of the constant-density magnetic storage medium after the time delay from detection of the respective servo sync mark to reach a repeatable run-out field location in the respective servo wedge of the respective track of the constant-density magnetic storage medium.

According to a second aspect of that first implementation, the controller may be configured to lock the clock source to rotation of the rotating constant-density magnetic storage medium by measuring elapsed time between detection of successive servo sync marks, and adjusting the clock source so that measured elapsed time between any two successive servo sync marks matches elapsed time between any other two successive servo sync marks.

In a second implementation of such a storage device, the controller may be configured to locate the position in the respective servo wedge by detecting a first servo sync mark and determine respective locations of the position in each successive servo wedge by adding a predetermined interval to each servo wedge location, continue to detect respective servo sync marks, measure a respective time interval between each respective servo sync mark detection and a predetermined event during each respective servo wedge, and take corrective action when a respective measured time interval, between a respective servo sync mark detection and the predetermined event during a respective servo wedge, differs from respective measured time intervals between previous respective servo sync mark detections and previous occurrences of the predetermined event during respective previous servo wedges.

According to a first aspect of that second implementation, the controller may be configured to take corrective action by aborting the writing of the repeatable run-out data to the rotating constant-density magnetic storage medium.

A second aspect of that second implementation may further include a clock source. The controller may further be configured to lock frequency of the clock source to rotation of the rotating constant-density magnetic storage medium by measuring elapsed time between detection of a first servo sync mark and detection of each subsequent servo sync mark detected, and taking corrective action when elapsed time, between the detection of the first servo sync mark and detection of a respective subsequent servo sync mark, differs from an elapsed time, between the detection of the first servo sync mark and detection of the respective subsequent servo sync mark, that is expected based on an expected interval between successive servo sync marks and how many intervals have passed between the first servo sync mark and the respective subsequent servo sync mark.

In a first instance of that second aspect, the controller may be configured to take corrective action by adjusting angular velocity of the rotating constant-density magnetic storage medium.

In a second instance of that second aspect, the controller may be further configured to align phase of the repeatable run-out data to the locked frequency of the clock source.

In a first variant of that second instance, the controller may be configured to align the phase of the repeatable run-out data to the locked frequency of the clock source by, after locking the frequency of the clock source, and before writing any repeatable run-out data to any servo wedge on the respective track of the rotating constant-density magnetic storage medium, writing a phase calibration pattern to each respective repeatable run-out field in each respective servo wedge on each track of the constant-density magnetic storage medium, reading the phase calibration pattern from each respective repeatable run-out field in each respective servo wedge on each track of the constant-density magnetic storage medium and determining a respective phase offset for each respective repeatable run-out field in each respective servo wedge on each track of the constant-density magnetic storage medium, and setting a respective delay for writing of repeatable run-out data to each respective repeatable run-out field in each respective servo wedge on each track of the constant-density magnetic storage medium to compensate for the respective phase offset.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which:

FIG. 4 is a timing diagram illustrating a first implementation of the subject matter of this disclosure;

FIG. 5 is a timing diagram, similar to FIG. 4, illustrating the operation of the implementation of FIG. 4 when a servo sync mark is missed;

FIG. 6 is a timing diagram, similar to FIG. 4, illustrating the operation of an alternate implementation of the subject matter of this disclosure;

FIG. 9 is a table comparing a frequency control technique, according to implementations of the subject of this disclosure, to a typical frequency technique;

DETAILED DESCRIPTION

Figure 1:
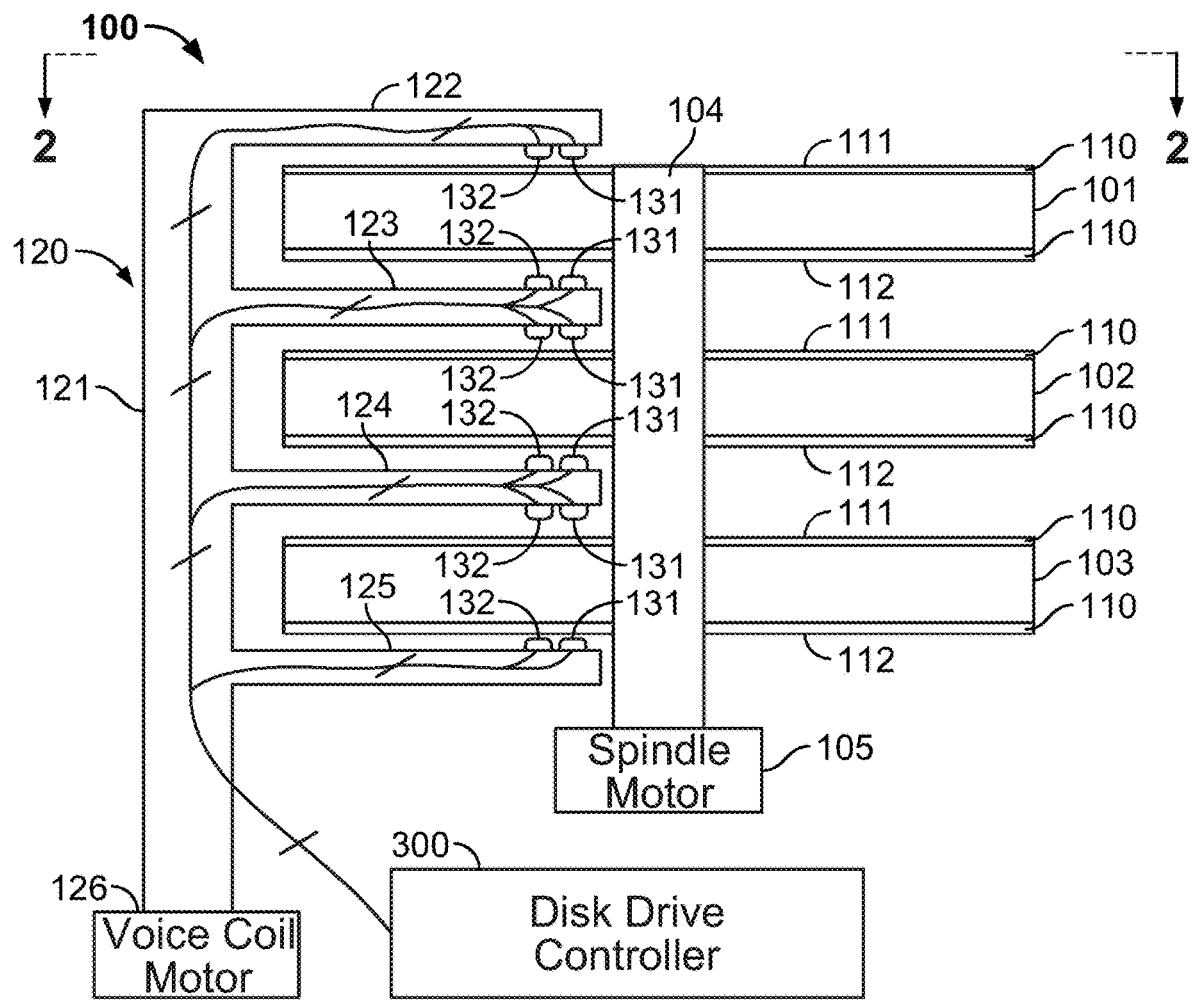
FIGS. 1 and 2 show an example of a disk drive 100 with which the subject matter of the present disclosure may be used.
Figure 2:
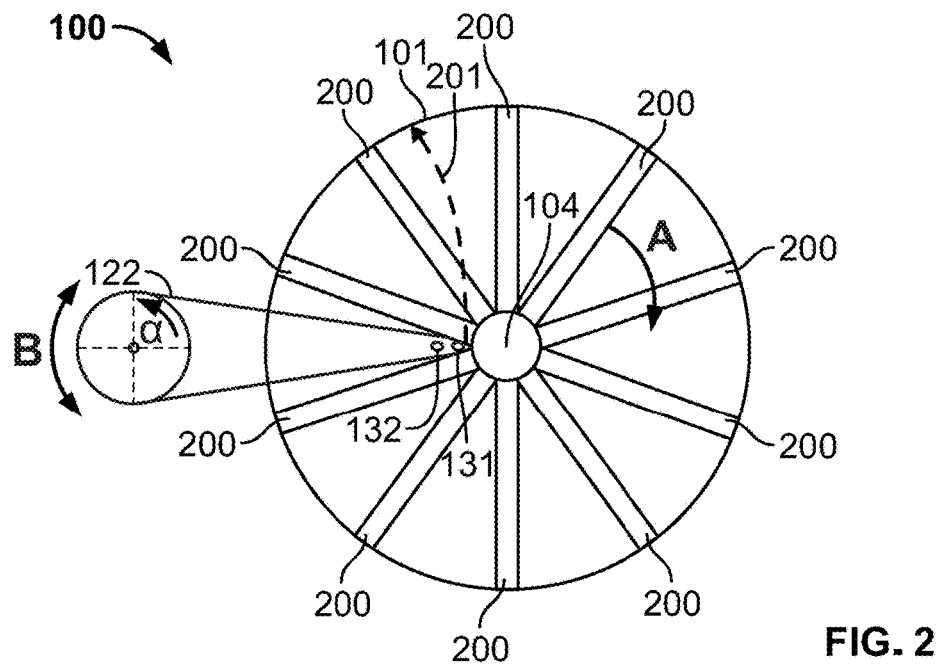

FIGS. 1 and 2 show an example of a disk drive 100 with which the subject matter of the present disclosure may be used. In this particular example, disk drive 100 has three platters 101, 102, 103, although any number of platters may be included in a disk drive with which the subject matter of the present disclosure may be used. As shown, each platter 101, 102, 103 has, on each of its upper and lower surfaces 111, 112, a coating 110 made from a material in which data can be stored, e.g., magnetically. The present disclosure also is relevant to a disk drive in which one or more platters includes coating 110 on only one of its surfaces, but such a disk drive would store less data in the same volume than a disk drive with two-sided platters. The platters 101-103 are mounted on a rotatable spindle 104. Spindle motor 105 rotates spindle 104 to rotate platters 101-103 in the direction of arrow A (FIG. 2). Although spindle motor 105 is shown connected directly to spindle 104, in some cases spindle motor 105 may be located off-axis of spindle 104 and would be connected to spindle 104 through belts or gears (not shown).

Read/write head assembly 120 includes an actuator 121 that bears arms 122-125, one of which is disposed adjacent to each surface 111, 112 of a platter 101, 102, 103 that has a memory storage coating 110. In this example, with heads on both surfaces of each of arms 123, 124, that amounts to four arms 122-125, but in the single-sided platter example discussed above, there would be only three arms. In other examples, the number of arms would increase or decrease along with the number of platters.

Each arm 122-125 bears, at or near its end furthest from actuator 121, and on both its upper and lower surfaces in the case of arms 123, 124, a plurality of read heads/sensors and write heads. In this case, two sensors 131, 132 are shown, and may represent, respectively, read and write sensors, although it in some applications each arm 123, 124 may bear more than one read head/sensor and more than one write head (not shown). In the configuration shown in FIGS. 1 and 2, arms 122-125 are aligned along a radius of platters 101-103, bringing heads 131, 132 as close as they can get to spindle 104. It should be noted that FIGS. 1 and 2 are schematic only and not to scale. Normally, the spindle diameter would be larger relative to the disk diameter. Moreover, arms 122-125 normally cannot point directly at the center of the disk.

A motor 126, commonly referred to as a "voice-coil motor," rotates actuator 121 back and forth along the directions of arrow B (FIG. 2) to move the heads 131, 132 along the path indicated by dashed arrow 201. The motion of actuator 121 thus changes both the radial and circumferential positions of heads 131, 132, but the circumferential positional change is relatively unimportant insofar as the platters are rotating. The motion of actuator 121 thus is used to control the radial position of heads 131, 132.

The location on surface 111 of platter 101 (the other surfaces are similar) of the aforementioned wedges is shown in FIG. 2. Each servo wedge 200 includes data identifying it by wedge index, track index, or sector number (to give an angular, tangential or circumferential position) and by data representing, at each point along a radius of the platter, the distance from spindle 104. While typical servo wedges are wedge-shaped as the name suggests, in a constant-density system as shown in FIG. 2, servo wedges 200 have the same width at every radius, or more to the point, the same arclength at every track.

Figure 3:
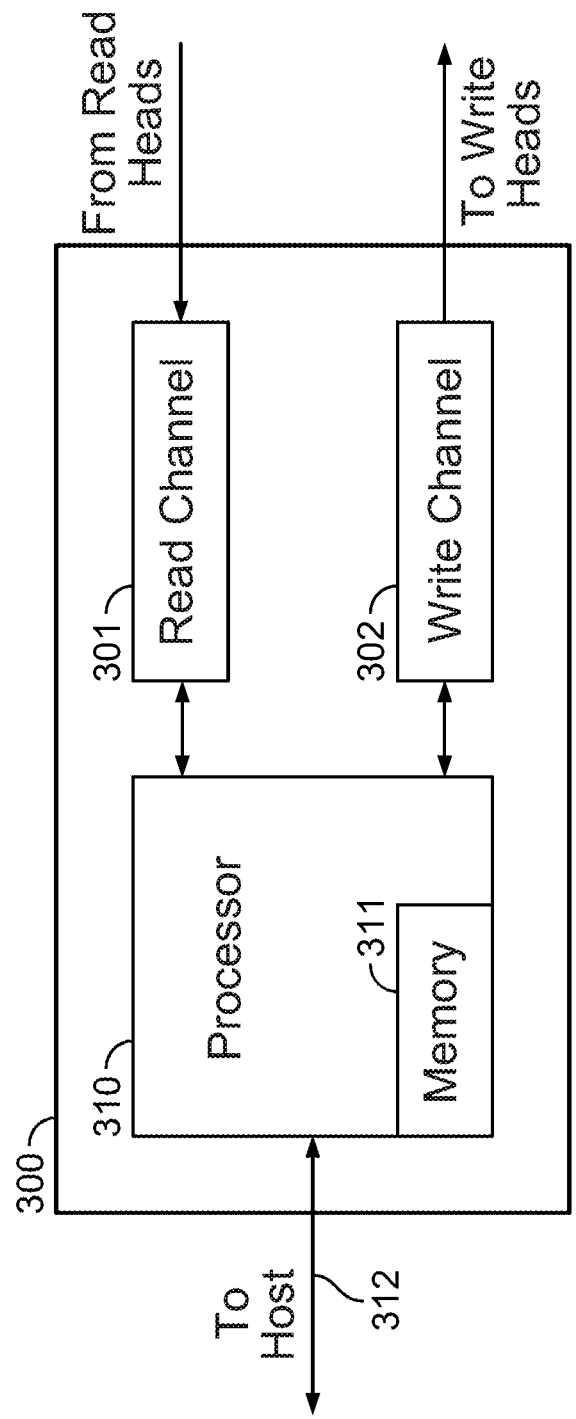
FIG. 3 is a diagram of a hard drive controller that may be used in a disk drive as in FIGS. 1 and 2 in implementations of the subject matter of this disclosure.

Each of read heads 131, 132 is connected to a read channel 301 of a hard drive controller 300 (there is a corresponding write channel 302) (FIG. 3). Hard drive controller 300 also includes a processor 310 and memory 311, as well as a connection 312 to a host processor (not shown). During normal disk operation, memory 311 may be used to store position error sensor (PES) data that indicates track position offsets. A servo control loop in hard drive controller 300 uses the PES data and the servo wedge data to keep the heads 131, 132 on track.

Servo wedge data can include a repeatable run-out field, providing information regarding any persistent recurring source of potential position error. For example, in a disk drive, physical imperfections of the platter may result in a vibration, occurring once each revolution, that may disrupt the head position. U.S. Pat. Nos. 7,400,464 and 7,773,328, each of which is hereby incorporated by reference herein in its respective entirety, describe the synchronous writing and reading, respectively, of RRO fields in servo wedges in non-constant-density implementations.

In a non-constant-density implementation, the frequency is the same for each track, based on the angular velocity of the disk drive platter. Thus, there is only one frequency of concern in the system. Similarly, in a zoned-density implementation, there is a different frequency for each zone, but each track within a zone shares the same frequency. On the other hand, in a constant-density implementation, such as that described in U.S. Pat. No. 10,971,187, which is hereby incorporated by reference herein in its entirety, the frequency increases as the radius increases and may be different for every track. Specifically, although the disk drive platter has a single angular velocity, writing occurs at a higher frequency for tracks closer to the outer diameter, which have a greater circumference than tracks closer to the inner diameter, so that more data is written per unit angle to maintain a constant data density per unit of track length.

Indeed, the writing pattern frequency may be different for every track. Moreover, the read and write heads are in different locations on the actuator arm. So to the extent that writing of the RRO field is triggered by detection of a servo sync mark (SSM), the frequency may not even be derivable directly from the SSM detection, because the read head may be at a different radial position than the write head and therefore may be over a different track with a different frequency. In addition, the read head is at a different angular position than the write head and therefore may detect the SSM at a time slightly before or after the time that the write head is in the appropriate place for writing of the RRO field.

Even for the same track, movement of the read and write heads relative to the servo wedge may occur at a frequency derived from a physical source (e.g., a phase-locked loop) while the frequency of the data pattern written to or read from the track may be a frequency interpolated from a physical frequency. Thus, there may be as many as four frequencies involved with any RRO write operation—the frequencies of the read head and the write head, and the interpolated frequencies of the data on the tracks being read and written. Moreover, different ones of the four frequencies may come from two different time domains (a servo function generator, or SFG, domain, and a time-base generator, or TBG, domain) which may derive from different physical sources and may not be synchronized.

When writing to a particular track, the correct frequencies for the write operation may be determined in accordance with implementations of the subject matter of this disclosure. In particular, while most of the servo data in servo wedges are written using, e.g., a self-servo write technique at the time of disk manufacture, RRO data is written to the servo wedges after the servo wedges are already in place. While the write pattern frequency may be determined by the radial location of the track which dictates the rate at which the data pattern is written to achieve the desired density, the servo pattern frequency, which dictates when and how often the RRO data is written to the track, may be determined in accordance with implementations of the subject matter of this disclosure.

According to some first implementations of the subject matter of this disclosure, and as described in more detail below, RRO data is written to a track at a predetermined offset from the detection of each servo sync mark (i.e., from the occurrence of a servo-sync-mark-found, or SSMF, signal). The offset accounts for the location of the RRO field in the servo wedge (usually at the end, after the remaining servo data), as well as for the difference in location (both radially and circumferentially) between, on the one hand, the write head, and, on the other hand, the read head that detects the SSMF signal that triggers the write operation.

The location of the RRO field in the servo wedge will generally be at about the same linear distance, measured along the current track, from the beginning of the servo wedge, and may be determined by a time delay, from the detected location of the respective servo wedge, that is inversely proportional to the respective radius of the current track. That is, for tracks with a smaller radius (i.e., closer to the inner edge of the disk platter), the linear velocity will be lower than the linear velocity at a larger radius (i.e., closer to the outer edge of the disk platter). Therefore, the time delay to achieve a uniform linear distance will be smaller for a larger radius and larger for a smaller radius.

Insofar as both the write pattern frequency and the servo pattern frequency may ultimately be derived from the angular velocity of the disk platter, those frequencies may be updated periodically (e.g., at each servo wedge) using known techniques such as Disk Synchronous Write (DSW) to maintain a lock to the disk platter rotation.

According to some second implementations of the subject matter of this disclosure, and as described in more detail below, RRO data is written to a track at fixed intervals from a first detection of the SSMF signal, based on the expected time interval between servo wedges at the track of interest as a function of the disk platter rotation. Even though SSMF detection is used only once for writing purposes, the timestamp of each occurrence of SSMF continues to be measured and the interval between that timestamp and the timestamp of a known recurring event within the servo wedge is determined for each servo wedge. If that interval is not constant from one servo wedge to the next, then an error is indicated and appropriate corrective action, which may include aborting the RRO write operation, may be taken.

As in the case of the first implementations, in these second implementations frequencies may be updated periodically (e.g., at each servo wedge) to maintain a lock to the disk platter rotation. However, in these second implementations, an alternate implementation of a DSW technique may be used for the frequency updates. Specifically, while typical DSW techniques measure the interval from one servo sync mark (SSM) to the next and look for deviation of each interval from an expected interval, in an alternate implementation according to the subject matter of this disclosure, a DSW technique may be used in which the location of each SSM is compared to its expected location based on the location of an initial SSM, the expected interval between adjacent SSMs, and the number of intervals between the current SSM and the initial SSM. Thus, while a typical DSW technique notes an error only when the current interval is not the expected interval, the DSW technique according to implementations of the subject matter of this disclosure may note an error if the current SSM is not in its expected location even if it is at the expected interval from the previous SSM. The DSW technique according to implementations of the subject matter of this disclosure thus compensates for accumulated drift, even if the drift from each SSM to the next is too slow to be detected.

The first and second implementations discussed above may be described as asynchronous. That is, while they attempt to match the RRO write frequency to the servo frequency, they do not attempt to match the phase of the servo pattern. However, some third implementations of the subject matter of this disclosure, which may be described as synchronous, also attempt to match the phase of the RRO write pattern to the phase of the servo pattern.

According to those third implementations, a technique such as one of the second implementations may be used to set the RRO frequency, as described in more detail below. Before any actual RRO data is written, a phase calibration pattern may be written to each RRO field. The phase calibration pattern may then be demodulated to determine a phase offset for the RRO field of each wedge. The RRO data may be written according to one of the second implementations described above, with the RRO data for each wedge being delayed, or otherwise phase-adjusted, as described in more detail below.

The subject matter of this disclosure may be better understood by reference to FIGS. 4-13.

The aforementioned first implementations may be understood by reference to FIGS. 4 and 5.

In FIG. 4, detection of servo sync marks (e.g., by one of read heads 131, 132, as recognized by hard drive controller 300) is illustrated by waveform or signal 401 (SSMF, or servo-sync-mark-found). Waveform or signal 402 (WCNTR) is a wedge timer or counter that, at the beginning of each servo wedge, resets to '0' and counts up until a next servo wedge is detected (or, optionally, until an adjustable limit is reached).

An additional counter, NWCNTR (not shown), counts the number of wedges (i.e., increments by '1' each time a servo wedge is detected), optionally resetting when an adjustable limit, such as the maximum number of servo wedges on the disk, is reached. For n servo wedges, NWCNTR would count from 0 to n–1.

Waveform or signal 403 (RROW) shows when RRO write events occur.

In the situation shown in FIG. 4, servo sync marks are found at 411, 421 and 431, causing WCNTR 402 to reset at 412, 422 and 432 and begin counting up. Resulting respective RRO write events 413, 423 and 433 occur when WCNTR 402 has counted an interval w1 from respective counter reset events 412, 422 and 432. RRO write events 413, 423 and 433 are indicated as occurring at times (0,w1), (1,w1) and (2,w1), where the ordinate represents the aforementioned wedge-number counter NWCNTR. Thus, RRO write event 413 occurs at NWCNTR=0, WCNTR=w1; RRO write event 423 occurs at NWCNTR=1, WCNTR=w1; and RRO write event 433 occurs at NWCNTR=2, WCNTR=w1. Insofar as WCNTR is acting as a timer, the interval w1 is a time delay used to achieve the aforementioned offset, and w1 may be smaller for tracks with larger radii and larger for tracks with smaller radii to keep the offset uniform.

As noted above, in these first implementations, WCNTR 402 resets, and RRO write events 413, 423 and 433 occur, whenever a servo sync mark is detected. Therefore, as shown in FIG. 5, if the servo sync mark is not detected at 521, WCNTR 502 will continue to count up—and there will be no RRO write event at 523—until the next servo sync mark 531 is detected, resetting WCNTR 502 and triggering RRO write event 533. The wedge-number counter NWCNTR also will not be triggered until servo sync mark 531 is detected, so the time when RRO write event 533 occurs is defined by NWCNTR=1, WCNTR=w1, rather than NWCNTR=2, WCNTR=w1, even though two sync mark intervals have passed since RRO write event 513 at NWCNTR=0, WCNTR=w1.

In order to prevent the missed RRO write event that occurs in the first implementations shown in FIGS. 4 and 5, in a variant of the first implementations of the subject matter of this disclosure, illustrated in FIG. 6, first and third resets 612, 632 of WCNTR 602 are triggered, respectively, by first and second servo sync mark found events (servo sync mark detections) 611, 631. However, by setting a maximum counter value for WCNTR 602 to a value corresponding to a time interval 610 slightly longer than the expected interval 410 between servo sync marks, a second reset 622 of WCNTR 602 may be triggered even in the absence of a servo sync mark detection at 621, although the resulting RRO write events 623 may be slightly offset relative to RRO write events 613, 633. The excess of interval 610 over interval 410 should be long enough to allow minor variations between servo sync mark detection events. As a result, servo sync mark detection would be the primary trigger for resetting WCNTR 602 and triggering RRO write events, but if a servo sync mark fails to trigger a servo sync mark detection, an RRO write event will nevertheless occur only slightly later than it should.

Figure 7:
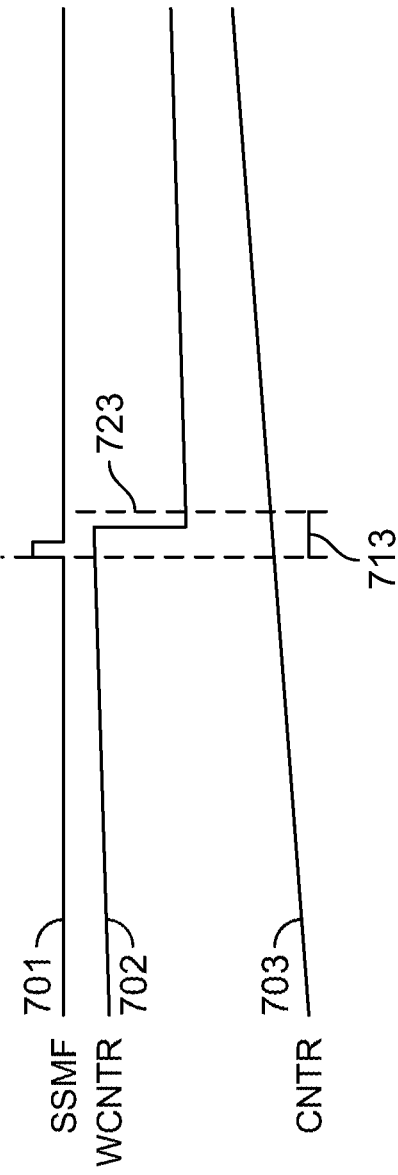
FIG. 7 is a timing diagram illustrating the operation of a further implementation of the subject matter of this disclosure.

The second implementations described above may be implemented as an extension of the variant shown in FIG. 6. As seen in FIG. 7, an asynchronous counter 703 may be used as a timer. Timestamps may be marked at each servo sync mark detection 701 and at uniform time 723 at or following each resulting wedge counter (WCNTR) reset 702, to determine a time difference 713. Although a different event 723 is shown as an example, using the reset event itself as the uniform time (not shown) is a convenient selection.

Figure 8:
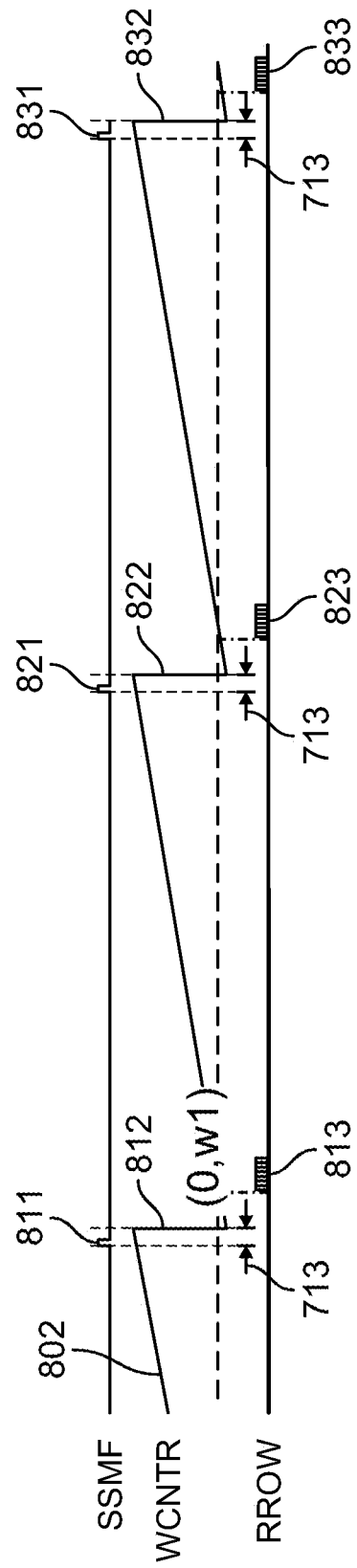
FIG. 8 is a more detailed timing diagram illustrating the operation of the implementation of FIG. 7.

As seen in more detail in FIG. 8, the first wedge counter reset 812 may be triggered by servo sync mark detection event 811, but each subsequent wedge counter reset 822, 832, etc., may be triggered by the passage of time from a previous wedge counter reset by setting a maximum value for WCNTR 802. However, the servo sync marks 821, 831, etc., would continue to be detected, and would be timestamped using timer 703, as would each wedge counter reset 822, 832, etc.

As in the case of FIG. 6, each wedge counter reset 822, 832, etc. would trigger a corresponding RRO write event 823, 833, etc. RRO write event 813 may be triggered by wedge counter reset 812, but a better result may be obtained by waiting until a full revolution has been completed and performing RRO write event 813 as the last RRO write event on the current track, after the timing has been verified as follows.

The time difference 713 may be measured between each servo sync mark detection event 811, 821, 831, etc., and the resulting write counter reset 812, 822, 832, etc. If the difference is not constant from one pair of SSM detection/WCNTR reset events to the next, corrective action may be taken. Corrective action may include adjusting the timing of the RRO write events or the disk rotation, but the simplest corrective action may be to abort and restart the RRO write operation for the current track (or for the disk as a whole).

Because of the importance of timing in these second implementations, control of the disk rotational frequency (disk synchronous write, or DSW, control) also is important. Typical DSW control measures the intervals between successive servo sync marks and uses feedback to control, e.g., a phased-lock loop to maintain constant disk rotational frequency. Because such a typical DSW approach looks only at the interval between the current servo sync mark and the immediately preceding servo sync mark, and only makes a correction when the interval deviates from the expected interval by more than a predetermined threshold, small errors—each too small by itself to meet the threshold for correction—can accumulate, but will never be detected.

Therefore, in accordance with implementations of the subject matter of this disclosure, an improved DSW control technique compares the time of detection of the current servo sync mark not to the previous servo sync mark, but to the expected time of occurrence of the current servo sync mark, based on the time of occurrence of the initial servo sync mark when the system is initialized, the expected interval between successive servo sync marks, and the number of intervals that have passed since the initial servo sync mark. According to such a technique, once one servo sync mark is detected at a time other than the expected time, each subsequent servo sync mark—even if each is detected at precisely the expected interval from the previous sync mark—will deviate from its expected time by that same amount. And if multiple servo sync marks deviate from the expected interval by a small amount (below the detection threshold of the typical technique described above), then eventually the accumulated error will be detected, and corrective action—e.g., adjusting the time base generator such as a phase-locked loop, or adjusting the disk angular velocity, or both—can be taken.

The difference between a typical DSW technique and the DSW technique just described ("New DSW") may be seen in the table in FIG. 9, which compares the two techniques over 17 servo wedges (NWCNTR=0, . . . , 16), and assumes that the target wedge-to-wedge (i.e., SSM-to-SSM) interval is 1000 time units. Row 901 shows the actual timestamp of the SSM detection events (SSMF), with the first wedge being detected at t=1000.

Row 904 shows the target SSMF timestamps based on that initial SSMF at t=1000. With a target interval of 1000 time units, the target timestamps for the second through seventeenth wedges are 2000, 3000, 4000, . . . , 17000. As seen on row 901, the actual timestamps for the second through seventeenth wedges are 2000.5, 3000.5, 4001, 5001, 6001, 7001.5, 8001.5, 9001.5, 10001.5, 11002, 12002, 13002, 14002, 15002, 16002 and 17002.

Rows 902 and 903 show how these discrepancies would be treated using a typical DSW technique. As shown on row 902, SSMF for the third, fifth, sixth, eighth, ninth, tenth and twelfth through seventeenth occurred at the expected interval of 1000 time units from the respective previous SSMF. Only for the second, fourth, seventh and eleventh wedges did each SSMF at an interval other than 1000 time units from the respective previous SSMF; in this example, SSMF for each of the second, fourth, seventh and eleventh wedges occurred at 1000.5 time units from the respective previous SSMF, which is a deviation for each of those wedges of 0.5 time units. According to a typical DSW technique, those deviations might be below a threshold of detection so that no corrective action would be taken, allowing errors on subsequent wedges to accumulate to 2 time units from their expected times (not detected at 903 but seen in the DSW technique just described (New DSW) at 905.

The DSW technique just described (New DSW) may be used in conjunction with the foregoing second implementations. This DSW technique also may be used with the foregoing first implementations. However, use of this DSW technique would not result in detectable improvement in the first implementations, because in the first implementations, each wedge is detected by its own servo sync mark, rather than by a time interval from an initial servo sync mark.

As noted above, the first implementations described in connection with FIGS. 4-6, and the second implementations described in connection with FIGS. 7 and 8, may be described as asynchronous, in that while they attempt to match the RRO write frequency to the servo frequency, they do not attempt to match the phase of the servo pattern. However, some third implementations of the subject matter of this disclosure, which may be described as synchronous, also attempt to match the phase of the RRO write pattern to the phase of the servo pattern.

According to those third implementations, a technique such as one of the second implementations may be used to set the RRO frequency, as described in connection with FIGS. 7 and 8, and in conjunction with the DSW technique described in conjunction with FIG. 9. After the RRO frequency is set but before actual RRO data is written, a phase calibration pattern—such as a 2T pattern (110011001100 . . . )—may be written to each RRO field. The phase calibration pattern may then be read and demodulated to determine a phase offset from the DSW frequency, and how much the write pattern should be delayed, as described in more detail below, to align its phase with the phase of the DSW frequency. After that delay has been determined, each RRO field is written as described above in accordance with the second implementations.

Figure 10:
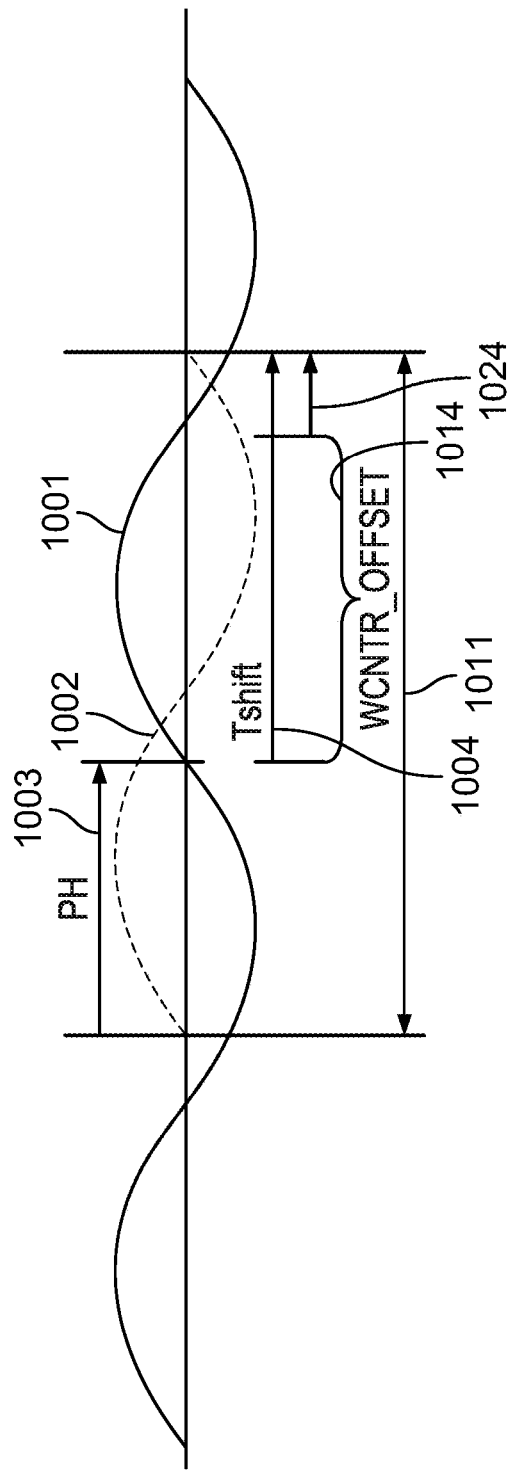
FIG. 10 is a graphical representation showing the phase discrepancy between a phase calibration pattern and an ideal pattern.
Figure 11:
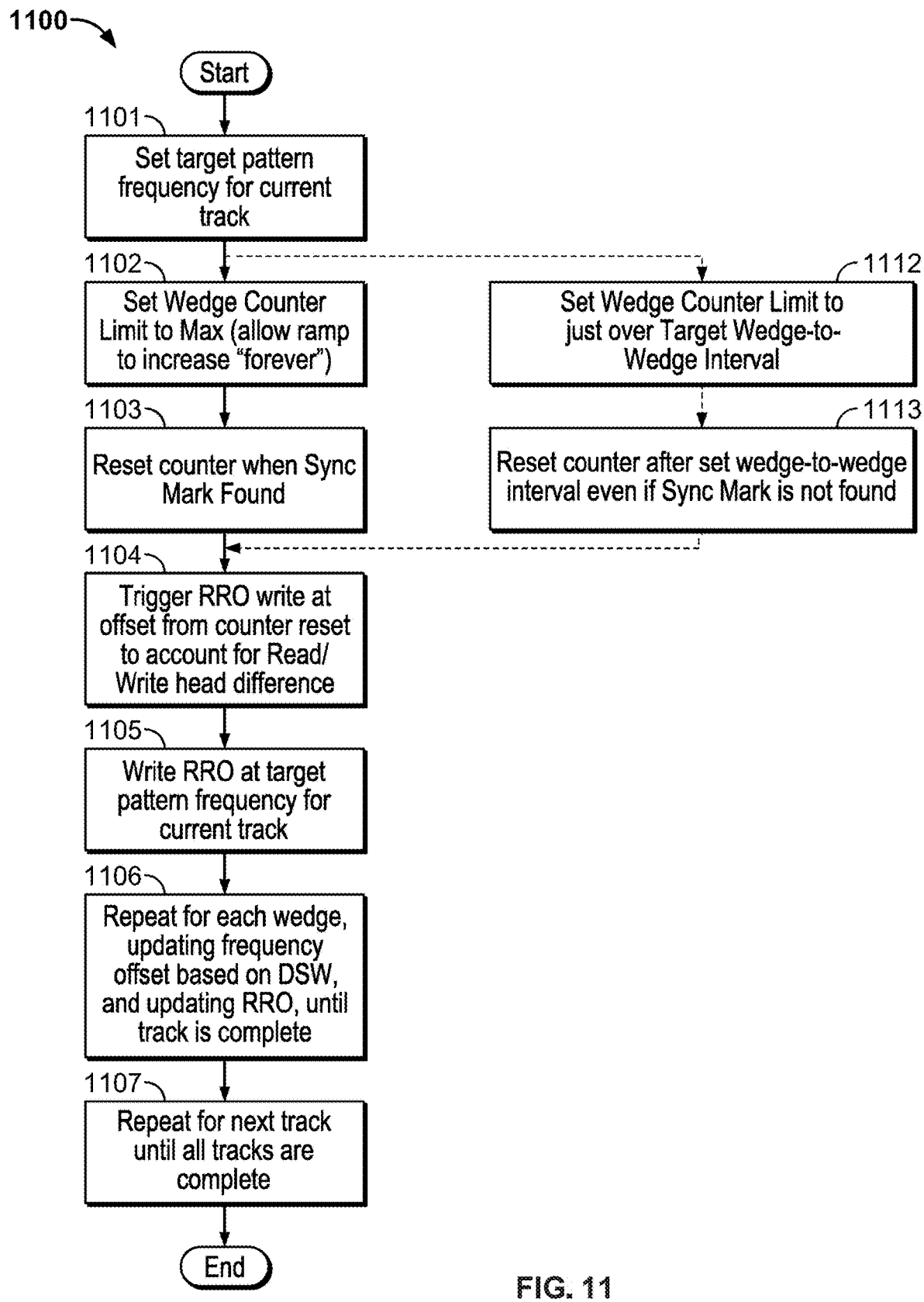
FIG. 11 is a flow diagram showing a method according to a first implementation of the subject matter of this disclosure.
Figure 12:
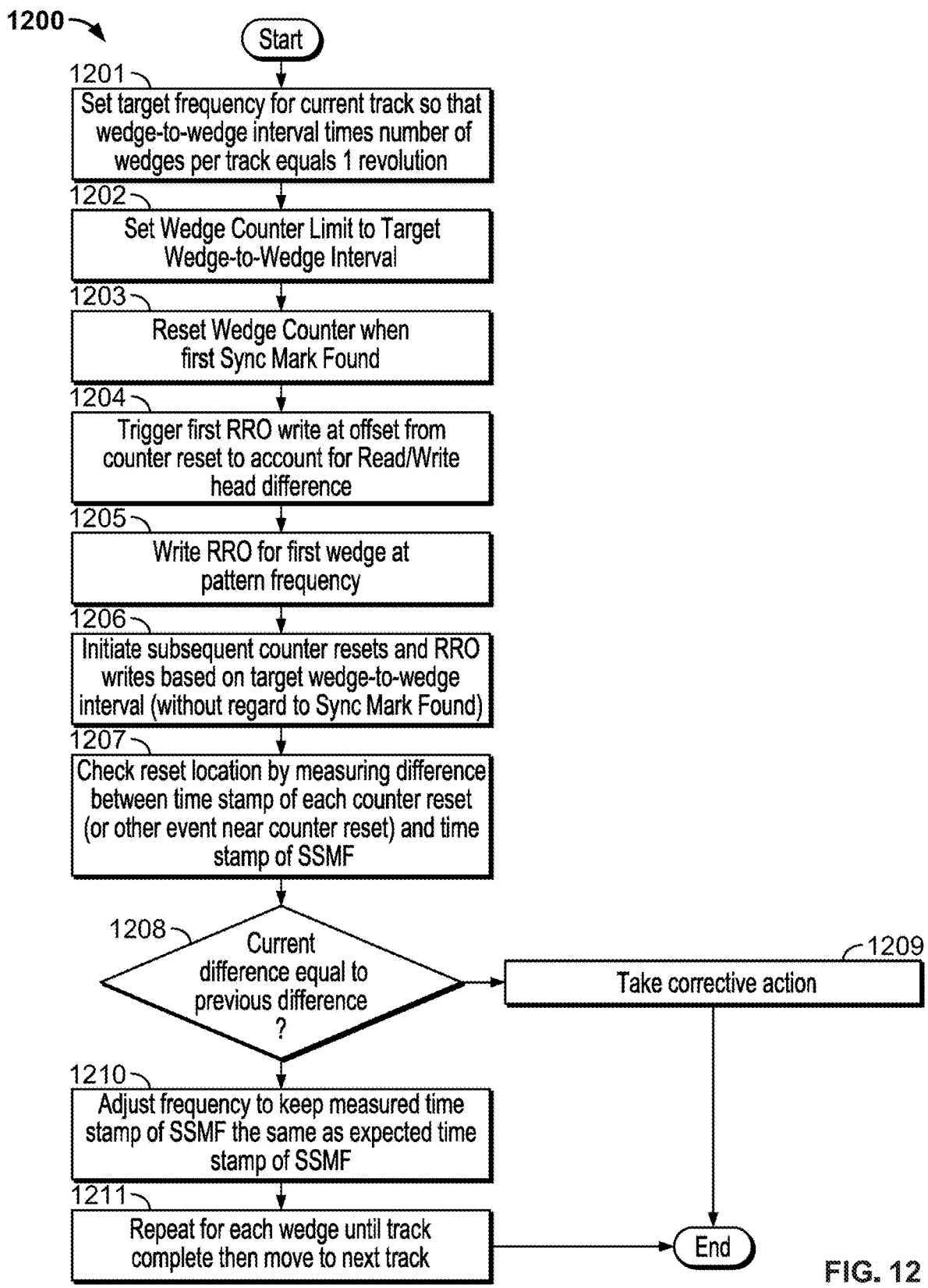
FIG. 12 is a flow diagram showing a method according to a second implementation of the subject matter of this disclosure.
Figure 13:
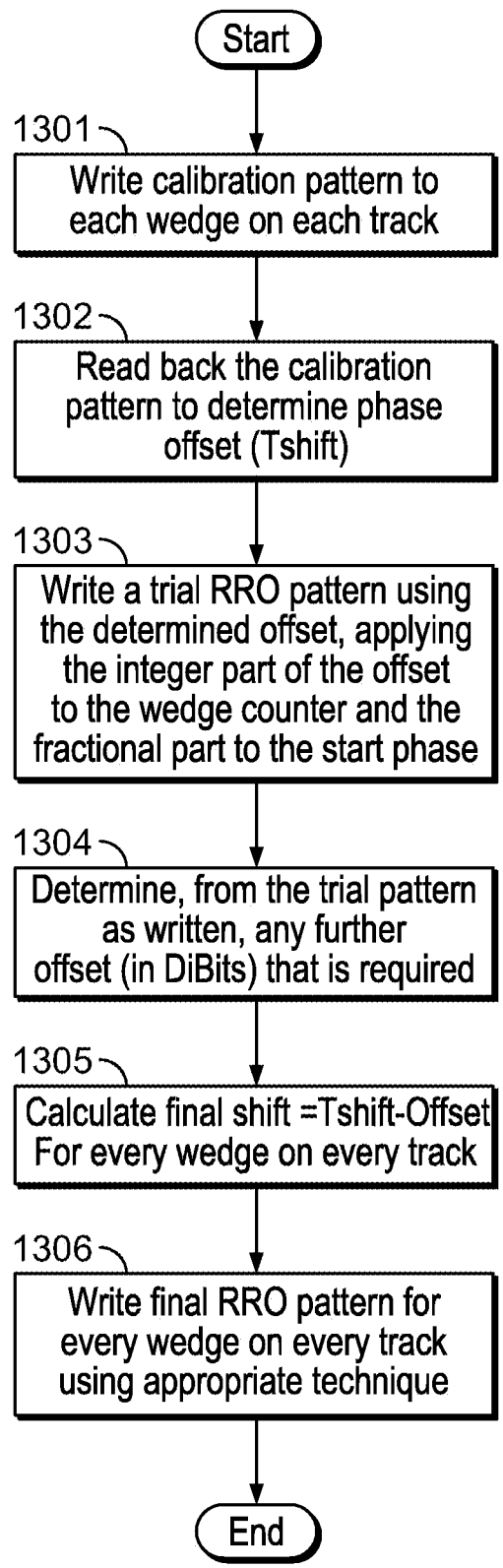
FIG. 13 is a flow diagram showing a method of phase calibration according to a third implementation of the subject matter of this disclosure.

FIG. 10 shows an example of a demodulated written calibration pattern 1001 as compared to one full period of an ideal phase pattern 1002. As can be seen, one full period 1011 of written pattern 1001 is delayed relative to ideal phase pattern 1002 by a phase delay (PH) 1003—i.e., period 1011 of written pattern 1001 starts later than ideal phase pattern 1002 by a delay amount PH 1003. Because it is not possible go backward in time, the phase of written pattern 1001 cannot be advanced. However, the phase of written pattern 1001 can be further delayed by the balance, $T_{shift}$ 1004, of a period, so that written pattern 1001 is delayed one full period, effectively bringing it back into phase with ideal pattern 1002.

In some implementations, written pattern 1001 is modulated in units of servo symbols, or "DiBits," which may be scaled by the number, BitSize, of physical write clock cycles required for 1 channel bit on the current track. In some implementations, the scaling factor is 4. Thus, if the unscaled value of $T_{shift}$ 1004 is $T_{shift}=(1-PH)$, then a trial scaled value of $T_{shift}$ would be $T_{shift}=(1-PH)\times BitSize \times 4$. The shift may be achieved by applying an integer number, WCNTR_OFFSET 1014, of wedge counter units to the wedge counter WCNTR, and then applying a phase remainder 1024:

$$T_{shift}=(1-PH)\times BitSize\times 4$$

$$WCNTR\_OFFSET=div(T_{shift},4)$$

$$Phase\_remainder\_1=mod(T_{shift},4)$$

The phase remainder 1024 may be applied, for example, as a start phase offset, while WCNTR_OFFSET 1014 may be applied by increasing the counter target of the write counter WCNTR (i.e., the value at which WCNTR resets).

Typically, the calibration pattern is not written to the final location of the RRO pattern, because it may not be possible to precisely overwrite the calibration pattern with the final pattern, which may leave residual noise. Therefore, after the trial RRO pattern has been written, the written trial RRO pattern is examined for location offset, which will be an integer number, DBOffset, of DiBits required to shift the written trial RRO pattern to its desired location in the servo wedge.

Once DBOffset has been determined, it is broken down, like $T_{shift}$, into an integer number of WCNTR_OFFSET units and a phase remainder:

Offset=DBOffset×BitSize−Phase_remainder_1

WCNTR_OFFSET=ceil$_4$(Offset)

Phase_remainder_2=WCNTR_OFFSET−Offset where ceil$_4$(Offset) is the smallest multiple of 4 that is equal to or greater than Offset (i.e., ceil$_4$(Offset)=Offset if Offset is a multiple of 4, while if Offset is not a multiple of 4, ceil$_4$(Offset) is the smallest multiple of 4 that is greater than Offset).

In the third implementations, these phase adjustment determinations of $T_{shift}$ and DBOffset—each in two components, one of which is a wedge counter adjustment and one of which is a phase remainder—are performed for every servo wedge on every track. Determinations of when to write the RRO field for each wedge on each track are then made according to the second implementations, but before the actual writing of RRO data to any particular wedge, the phase adjustment $T_{shift}$-DBOffset, broken into its WCNTR_OFFSET and remainder components, is applied to the particular RRO write operation.

Methods of writing RRO patterns according to the various implementations described above are diagrammed in FIGS. 11-13.

Method 1100 according to some of the first implementations described above is diagrammed in FIG. 11. At 1101, a pattern frequency is set for the current track. At 1102, the target value of WCNTR is set to its maximum possible value so that WCNTR will count for longer than any possible wedge-to-wedge interval (essentially "forever"). At 1103, on occurrence of a servo-sync-mark-found event, WCNTR is reset and allowed to begin counting. As an alternate implementation, the target value may be set at 1112 to a value just over the expected wedge-to-wedge interval and then WCNTR may be reset at 1113 when a wedge-to-wedge interval passes, even when a servo-sync-mark-found event does not occur, by setting. At 1104, an RRO write event is triggered at a predetermined time after WCNTR was reset, to account for the location of the RRO field in the wedge, as well as to account for position differences between the READ head that finds the servo sync mark and the WRITE head that performs the RRO write operation. At 1105, the RRO write operation is carried out at the pattern frequency that was set at 1101. At 1106, operations at 1101-1105 are repeated for every wedge in the current track, until the track is complete. Between wedges, the frequency may be updated using typical DSW techniques, or DSW techniques according to this disclosure, as described above. At 1107, operations at 1101-1106 are repeated for each additional track, until all tracks are complete.

Method 1200 according to some of the second implementations described above is diagrammed in FIG. 12. At 1201, a time base frequency is selected so that the product of the wedge-to-wedge interval and the number of wedges corresponds to one disk revolution. Once this frequency has been selected, a write pattern frequency may be generated from this frequency using, e.g., synchronous write pattern frequency modification—i.e., the ability of a servo write pattern generator to write at a frequency that is a rational, non-integer multiple of the time base frequency, as described in U.S. Pat. No. 10,832,716, which is hereby incorporated by reference herein in its entirety.

At 1202, the target value of WCNTR is set to a target wedge-to-wedge interval. At 1203, a first servo sync mark is found, and WCNTR is reset. At 1204, a first RRO write event is triggered at a predetermined time after the reset of WCNTR, to account for the location of the RRO field in the wedge, as well as to account for position differences between the READ head that finds the initial servo sync mark and the WRITE head that performs the RRO write operation. At 1205, the RRO write operation is carried out at a pattern frequency derived from the frequency that was set at 1201. At 1206, subsequent WCNTR resets and corresponding RRO write operations are triggered based on the target wedge-to-wedge interval from the previous WCNTR reset.

At 1207, servo sync marks continue to be detected (even though they are not used to trigger WCNTR resets), and the difference between the time stamp of each servo-sync-mark-found event, and the time stamp of its corresponding subsequent timer-based WCNTR reset event, is measured. Each time stamp difference is compared at 1208 to the previous time stamp difference. If at 1208 the current time stamp difference is not the same as the previous time stamp difference, then at 1209 corrective action (which may include aborting and restarting the RRO write operation) is taken.

If at 1208 the current time stamp difference is the same as the previous time stamp difference, then flow continues to 1210 where the frequency is adjusted to maintain the occurrence of each servo-sync-mark-found event at an expected time, as described above in connection with FIG. 9, for example. This comparison of time stamp differences and adjustment of the frequency if necessary, may occur at any time during method 1200, and may occur in parallel with the remainder of method 1200.

The foregoing portions of method 1200 are repeated at 1211 for each wedge in the current track until the track is completed. The method then moves on to the next track until all tracks are completed.

Method 1300 according to some of the third implementations described above is diagrammed in FIG. 13. At 1301, a respective calibration pattern (e.g., a 2T pattern as described above) is written to each wedge on each track of the disk. At 1302, the calibration pattern is read back from each wedge to determine a respective trial phase offset ($T_{shift}$) for that wedge. At 1303, a respective trial RRO pattern is written to each respective wedge, using the respective phase offset applying the integer part of the offset to the wedge counter and the fractional part to the start phase. At 1304, any necessary further phase offset is determined for each respective wedge from the respective trial pattern. At 1305, a respective final phase shift for each respective wedge is determined by subtracting the respective further phase offset from the respective trial phase offset ($T_{shift}$-Offset). At 1306, the respective final phase shift for each respective wedge is used in a method such as method 1200 to write a respective final RRO pattern to each respective wedge on each track of the disk.

Thus it is seen that a method and apparatus for controlling the timing when writing an RRO field in a particular track of a constant-density servo wedge have been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method for writing repeatable run-out data, representing a recurring contribution to position error, to a rotating constant-density magnetic storage medium, the method comprising:
repeating, for each respective track at a respective radius of the constant-density magnetic storage medium:
determining a respective track pattern frequency based on track location and desired data density,
locating a position in a respective servo wedge on the respective track based on servo sync mark detection,
writing the repeatable run-out data to the respective servo wedge at a time delay, from the location of the position in the respective servo wedge, that is inversely proportional to the respective radius, to achieve a predetermined offset, and
repeating the determining, the locating and the writing for each servo wedge on the respective track of the constant-density magnetic storage medium.

2. The method of claim 1 wherein:
locating the position in the respective servo wedge based on servo sync mark detection comprises locating the position in each respective servo wedge by detecting a respective servo sync mark in the respective servo wedge.

3. The method of claim 2 wherein writing the repeatable run-out data to the respective servo wedge at the predetermined offset comprises writing the repeatable run-out data to the servo wedge after the time delay from detection of the respective servo sync mark to reach a repeatable run-out field location in the respective servo wedge.

4. The method of claim 2 further comprising locking a clock source to rotation of the rotating constant-density magnetic storage medium by:
measuring elapsed time between detection of successive servo sync marks; and
adjusting the clock source so that measured elapsed time between any two successive servo sync marks matches elapsed time between any other two successive servo sync marks.

5. The method of claim 1 wherein:
locating the position in the respective servo wedge based on servo sync mark detection comprises locating a first servo wedge by detecting a first servo sync mark and determining respective locations of each successive servo wedge by adding a predetermined interval to each servo wedge location; and
the method further comprises:
continuing to detect respective servo sync marks,
measuring a respective time interval between each respective servo sync mark detection and a predetermined event during each respective servo wedge, and
when a respective measured time interval, between a respective servo sync mark detection and the predetermined event during a respective servo wedge, differs from respective measured time intervals between previous respective servo sync mark detections and previous occurrences of the predetermined event during respective previous servo wedges, taking corrective action.

6. The method of claim 5 wherein taking corrective action comprises aborting the writing of the repeatable run-out data to the rotating constant-density magnetic storage medium.

7. The method of claim 5 further comprising locking frequency of a clock source to rotation of the rotating constant-density magnetic storage medium by:
measuring elapsed time between detection of a first servo sync mark and detection of each subsequent servo sync mark detected; and
when elapsed time, between the detection of the first servo sync mark and detection of a respective subsequent servo sync mark, differs from an elapsed time, between the detection of the first servo sync mark and detection of the respective subsequent servo sync mark, that is expected based on an expected interval between successive servo sync marks and how many intervals have passed between the first servo sync mark and the respective subsequent servo sync mark, taking corrective action.

8. The method of claim 7 wherein taking corrective action comprises adjusting angular velocity of the rotating constant-density magnetic storage medium.

9. The method of claim 7 further comprising aligning phase of the repeatable run-out data to the locked frequency of the clock source.

10. The method of claim 9 wherein aligning the phase of the repeatable run-out data to the locked frequency of the clock source comprises, after locking the frequency of the clock source, and before writing any repeatable run-out data to any servo wedge on the rotating constant-density magnetic storage medium:
writing a phase calibration pattern to each respective repeatable run-out field in each respective servo wedge on each track;
reading the phase calibration pattern from each respective repeatable run-out field in each respective servo wedge on each track and determining a respective phase offset for each respective repeatable run-out field in each respective servo wedge on each track; and
setting a respective delay for writing of repeatable run-out data to each respective repeatable run-out field in each respective servo wedge on each track to compensate for the respective phase offset.

11. A storage device, comprising:
a rotating constant-density storage medium on which servo data is written, the servo data including a repeatable run-out field representing a recurring contribution to position error; and
circuitry for writing the repeatable run-out field, the circuitry comprising:
a detector configured to locate a respective servo wedge on each respective track of the constant-density magnetic storage medium based on servo sync mark detection; and
a controller configured to repeat, for each respective track at a respective radius of the constant-density magnetic storage medium:
determining a respective track pattern frequency based on track location and desired data density,
locating a position in a respective servo wedge of the respective track of the constant-density magnetic storage medium based on output of the detector,
writing the repeatable run-out data to the respective servo wedge of the respective track of the constant-density magnetic storage medium at a time delay, from the location of the position in the respective servo wedge, that is inversely proportional to the respective radius, to achieve a predetermined offset, and repeating the determining, the locating and the writing for each servo wedge on the respective track of the constant-density magnetic storage medium.

12. The storage device of claim 11 wherein:
the controller is configured to locate the position in the respective servo wedge of the respective track of the constant-density magnetic storage medium by detecting a respective servo sync mark in the respective servo wedge of the respective track of the constant-density magnetic storage medium.

13. The storage device of claim 12 wherein the controller is configured to write the repeatable run-out data to the respective servo wedge of the respective track of the constant-density magnetic storage medium after the time delay from detection of the respective servo sync mark to reach a repeatable run-out field location in the respective servo wedge of the respective track of the constant-density magnetic storage medium.

14. The storage device of claim 12 further comprising a clock source; wherein:
the controller is configured to lock the clock source to rotation of the rotating constant-density magnetic storage medium by:
measuring elapsed time between detection of successive servo sync marks; and
adjusting the clock source so that measured elapsed time between any two successive servo sync marks matches elapsed time between any other two successive servo sync marks.

15. The storage device of claim 11 wherein the controller is configured to:
locate the position in the respective servo wedge by detecting a first servo sync mark and determine respective locations of the position in each successive servo wedge by adding a predetermined interval to each servo wedge location;
continue to detect respective servo sync marks;
measure a respective time interval between each respective servo sync mark detection and a predetermined event during each respective servo wedge; and
take corrective action when a respective measured time interval, between a respective servo sync mark detection and the predetermined event during a respective servo wedge, differs from respective measured time intervals between previous respective servo sync mark detections and previous occurrences of the predetermined event during respective previous servo wedges.

16. The storage device of claim 15 wherein the controller is configured to take corrective action by aborting the writing of the repeatable run-out data to the rotating constant-density magnetic storage medium.

17. The storage device of claim 15 further comprising a clock source; wherein:
the controller is further configured to lock frequency of the clock source to rotation of the rotating constant-density magnetic storage medium by:
measuring elapsed time between detection of a first servo sync mark and detection of each subsequent servo sync mark detected, and
taking corrective action when elapsed time, between the detection of the first servo sync mark and detection of a respective subsequent servo sync mark, differs from an elapsed time, between the detection of the first servo sync mark and detection of the respective subsequent servo sync mark, that is expected based on an expected interval between successive servo sync marks and how many intervals have passed between the first servo sync mark and the respective subsequent servo sync mark.

18. The storage device of claim 17 wherein the controller is configured to take corrective action by adjusting angular velocity of the rotating constant-density magnetic storage medium.

19. The storage device of claim 17 wherein the controller is further configured to align phase of the repeatable run-out data to the locked frequency of the clock source.

20. The storage device of claim 19 wherein the controller is configured to align the phase of the repeatable run-out data to the locked frequency of the clock source by, after locking the frequency of the clock source, and before writing any repeatable run-out data to any servo wedge on the respective track of the rotating constant-density magnetic storage medium:
writing a phase calibration pattern to each respective repeatable run-out field in each respective servo wedge on each track of the constant-density magnetic storage medium;
reading the phase calibration pattern from each respective repeatable run-out field in each respective servo wedge on each track of the constant-density magnetic storage medium and determining a respective phase offset for each respective repeatable run-out field in each respective servo wedge on each track of the constant-density magnetic storage medium; and
setting a respective delay for writing of repeatable run-out data to each respective repeatable run-out field in each respective servo wedge on each track of the constant-density magnetic storage medium to compensate for the respective phase offset.

\* \* \* \* \*